(12) United States Patent
Kerfeld

(10) Patent No.: US 6,354,827 B1
(45) Date of Patent: Mar. 12, 2002

(54) STAMPER ASSEMBLY FOR MANUFACTURING OPTICAL DATA STORAGE DISKS

(75) Inventor: Donald J. Kerfeld, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/190,969

(22) Filed: Nov. 12, 1998

(51) Int. Cl.⁷ .............................................. B29D 17/00
(52) U.S. Cl. ...................... 425/195; 425/195; 425/542; 425/810; 264/106; 264/107
(58) Field of Search ................. 425/195, 810, 425/542; 264/1.33, 106, 107

(56) References Cited

U.S. PATENT DOCUMENTS

| | | | |
|---|---|---|---|
| 4,296,158 A | * 10/1981 | Lewis | 428/65 |
| 4,302,411 A | * 11/1981 | Nakagawa et al. | 264/107 |
| 4,374,077 A | 2/1983 | Kerfeld | 264/22 |
| 4,391,579 A | * 7/1983 | Morrison | 425/548 |
| 4,845,000 A | * 7/1989 | Takeoka et al. | 430/14 |
| 5,174,937 A | * 12/1992 | Tamura et al. | 264/106 |
| 5,279,906 A | * 1/1994 | Yoshimura et al. | 429/30 |
| 5,330,880 A | * 7/1994 | Horigome et al. | 430/321 |
| 5,489,410 A | * 2/1996 | Baumgartner et al. | 264/219 |
| 5,783,371 A | * 7/1998 | Bifano | 430/321 |
| 5,792,492 A | * 8/1998 | Takahashi | 425/547 |

* cited by examiner

Primary Examiner—Nam Nguyen
Assistant Examiner—Donald Heckenberg
(74) Attorney, Agent, or Firm—Eric D. Levinson

(57) ABSTRACT

Disclosed is a stamper assembly for forming an optical data storage disk in a disk molding process. The stamper assembly includes a block element having a first major surface, and a stamper member having a first major surface and an opposite, second major surface. The first major surface of the stamper member is adapted to contact a disk molding material for forming an optical data storage disk in a disk molding process. The stamper assembly further includes a medium for securing the stamper member to the block element, such that substantially the entire second major surface of the stamper member is affixed to the first major surface of the block element. This arrangement prevents relative movement between the stamper member and the block element. This substantially reduces stamper member wear and increases the useful production lifetime of the stamper assembly. The stamper assembly is useable in a mold assembly either by itself or with another like stamper assembly to form either single-sided or double-sided optical data storage disks.

10 Claims, 9 Drawing Sheets

STAMPER ASSEMBLY FOR MANUFACTURING OPTICAL DATA STORAGE DISKS

TECHNICAL FIELD

This invention relates to the manufacture of data storage disks. In particular, the present invention is a method of manufacturing a stamper assembly and a stamper assembly for producing replica optical data storage disks that minimizes stamper wear and minimizes defects in the molded replica disks that would adversely affect the readability of the manufactured disks.

BACKGROUND OF THE INVENTION

Optical data storage disks have gained widespread acceptance for the storage, distribution and retrieval of large volumes of information. These disks include audio and video program material, as well as computer programs and data. Formats of optical data storage disks include audio CD (compact disc), CD-R (CD-recordable), CD-ROM (CD-read only memory), DVD (digital versatile disk or digital video disk) media, DVD-RAM (random access memory), and various types of rewritable media, such as magneto-optical (MO) disks and phase change optical disks.

In general, optical disks (such as CD-ROM's) are produced using a disk replication process. A master disk is made having a desired surface relief pattern formed therein which represents the data to be replicated. The surface relief pattern is typically created using an exposure step (e.g., by laser recording). The master disk is used to make a stamper, which, in turn, is used in an injection molding process to make production quantities of replica optical disks. As such, the surface relief pattern and precision of the single master disk can be transferred into many inexpensive replica disks, such that each replica disk contains the data and tracking information which was encoded in the master disk.

The optical disk replication process typically entails the use of a mold assembly that generally includes a fixed side and a moving side. To form a replica optical disk formatted on only one side (i.e., typically termed a single-sided disk), the stamper is attached to the moving side of the mold assembly for duplicating a desired surface relief pattern (i.e., lands, grooves and/or pits) into a replica disk substrate. Typically, the stamper is removably secured to a mirror block of the moving side of the mold assembly via an inner holder and an outer holder. The inner holder engages an inner peripheral edge of a central opening of the stamper, while the outer holder engages an outer peripheral edge of the stamper. The inner and outer holders are removable to permit changeout of the stamper, which allows the mold assembly to be used to manufacture replica disk substrates having different surface relief patterns. In addition, the ability to changeout the stamper also allows damaged or worn stampers to be replaced with a new stamper having the same surface relief pattern as the stamper that is being replaced. A central area of the mold assembly generally includes several tooling parts, such as a movable gate cut for cutting a central opening in the replica disk substrates.

During the disk molding process, a resin, typically optical grade polycarbonate, is forced into a substrate cavity within the mold assembly through a sprue channel to form the disk substrate. The surface relief pattern (i.e., the formatted surface) defining the information side of the optical disk is replicated in the disk substrate by the stamper as the substrate cavity is filled. After filling, the gate cut is brought forward to cut a center hole in the disk substrate. After the replica disk substrate has sufficiently cooled, the mold assembly is opened and the gate cut and a product eject may be brought forward for ejecting the formatted replica disk substrate off of the stamper. Typically, the information side of the replica disk substrate is then coated with a reflectance layer, such as a thin layer of aluminum, and in the case where the replica disk substrate is a CD, the reflectance layer is followed by a protective layer of lacquer to complete the process for producing single-sided replica, optical data storage disks. Since the fixed side of the above described mold assembly cannot accommodate a stamper, to produce a replica optical disk formatted on both sides (i.e., typically termed a double-sided disk), requires that two single-sided disks be secured together in a back-to-back relationship such their formatted surfaces (i.e., the surfaces having the relief pattern of the master disk) face outward.

Although the above described mold assembly and replication process produces adequate replica, optical data storage disks, there are some disadvantages. For example, since the inner and outer holders of the mold assembly only secure the stamper to the mirror block at the inner and outer peripheral edges of the stamper, the stamper can move relative to the mirror block. This movement is caused by pressure and temperature cycling (i.e., expansion and contraction) of the stamper during the molding process, and stamper flexing during opening of the mold assembly and the subsequent ejection of the formatted replica disk substrate off of the stamper. The relative movement between the stamper and the mirror block causes wear on the backside of the stamper as well as wear to the mirror block. Any excessive wear to either of these components would adversely affect the playability of the manufactured, replica optical disks. For instance, excessive wear of the stamper and/or the mirror block causes roughness to be molded into the replica disk substrates. This roughness increases the noise floor causing playability issues with the molded optical disk. In extreme cases, this relative movement between the stamper and the mirror block can result in catastrophic damage to one or both of these components, requiring immediate replacement of the damaged element. Because the stamper can become worn or damaged over time, the typical stamper has an average useful lifetime spanning the production of only approximately 50,000 replica disk substrates.

The above described mold assembly and replication process has further disadvantages. For example, because the stamper flexes during opening of the mold assembly and the subsequent ejection of the formatted replica disk substrate, the stamper loses contact with the mirror block. Since the mirror block acts as a heat sink to cool the stamper during the replication process, this loss of contact between the stamper and the mirror block causes the transfer of heat from the stamper to the mirror block to be nonuniform. This nonuniform heat transfer results in uneven cooling of the replica disk substrate, which can affect the formation of the surface relief pattern and ultimately, adversely affect the playability of the manufactured, replica optical disk. In severe cases, this nonuniform heat transfer can cause the replica disk substrates to prematurely separate from the stamper resulting in incomplete formation of the surface relief patterns and unusable replica optical disks.

There is a need for an improved stamper assembly for use in a mold assembly to produce replica optical data storage disks, and for an improved method of stamper assembly manufacture. In particular, there is a need for a stamper assembly that minimizes stamper wear, and thereby, minimizes defects in the molded replica disks that would adversely affect the playability of the manufactured disks. The stamper assembly should increase the average useful lifespan of a stamper to allow more replica optical disks to be produced from each stamper assembly. In addition, the stamper assembly should permit even cooling of the formed replica disk substrates to further minimize defects that can affect playability. Moreover, the stamper assembly should provide these features while being relatively easy and inexpensive to manufacture.

SUMMARY OF THE INVENTION

The present invention is a stamper assembly for forming an optical data storage disk in a disk molding process. The stamper assembly includes a block element having a first major surface, and a stamper member having a first major surface and an opposite, second major surface. The first major surface of the stamper member is adapted to contact a disk molding material for forming an optical data storage disk in a disk molding process. The stamper assembly further includes a medium for securing the stamper member to the block element, such that substantially the entire second major surface of the stamper member is affixed to the first major surface of the block element. This arrangement prevents relative movement between the stamper member and the block element. The stamper assembly is useable in a mold assembly either by itself or with another like stamper assembly to form either single-sided or double-sided optical data storage disks.

The stamper assembly of the present invention is manufactured by first applying a curable liquid material to substantially the entire first major surface of the block element. A forming stamper is then positioned on the curable liquid material such that substantially an entire first major surface of the forming stamper contacts the liquid material. Next, the liquid material is cured to form a substantially rigid cured layer on the block element. Once cured, this cured layer of once liquid material is affixed to substantially the entire first major surface of the block element so as to prevent relative movement between the cured layer and the block element. The forming stamper is then removed from the cured layer leaving the stamper assembly wherein the cured layer defines the stamper member for forming optical disks in a disk molding process. In an alternative embodiment of the stamper assembly, the stamper member is made of metal and is secured to the block element via an adhesive.

This stamper assembly prevents relative movement between the stamper member and the block element, since substantially the entire second major surface of the stamper member is affixed to the first major surface of the block element. Because the stamper member is totally secured to the block element, movement of the stamper member relative to the block element due to pressure and temperature cycling (i.e., expansion and contraction) during the molding process is virtually eliminated. In addition, stamper flexing during opening of the mold assembly and the subsequent ejection of the formatted replica disk substrate off of the stamper member is essentially nonexistent. Since the stamper member no longer loses contact with the block element, the block element uniformly draws heat from the stamper member to provide even cooling of the replica disk substrates. Even cooling of the disk substrates improves the formation of the surface relief patterns and ultimately the playability of the manufactured replica optical disks. Moreover, the medium for securing the stamper member to the block element provides insulating properties that slow the transfer of heat from the stamper member to the block element. This slowing of heat transfer allows the replica disk substrates to remain hotter slightly longer during the molding process, which makes the surface relief pattern easier to form.

With virtually no relative movement between the stamper member and the block element, excessive wear on the second major surface (i.e., backside) of the stamper member and excessive wear to the block element is substantially eliminated. Hence, the noise floor increase and the playability issues, due to roughness in the molded replica optical disks because of excessive wear to either of these components, is no longer a principal concern. Moreover, because stamper member wear has been substantially curtailed, the stamper assembly of the present invention has an increased average, useful production lifetime. In addition, since the stamper member is directly affixed to the first major surface of the block element, the stamper assembly of the present invention is useable either by itself or with another like stamper assembly on either one or both of the fixed and moving sides of the mold assembly to form either single-sided or double-sided optical data storage disks. Lastly, the stamper assembly of the present invention provides all these features while being relatively easy and inexpensive to manufacture.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
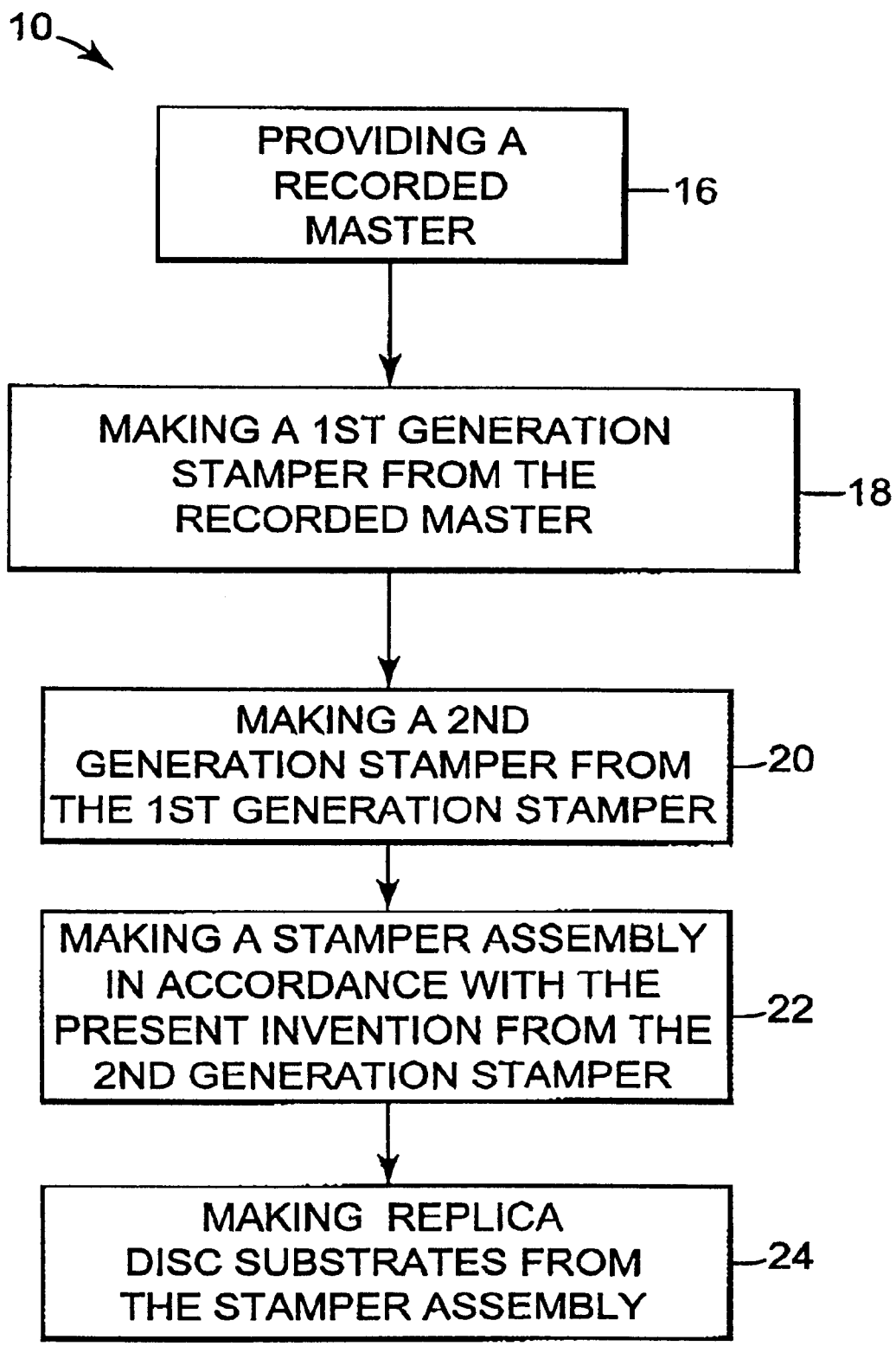
FIG. 1 is a block diagram illustrating a process for making an optical data storage disk stamper assembly in accordance with the present invention.
Figure 2:
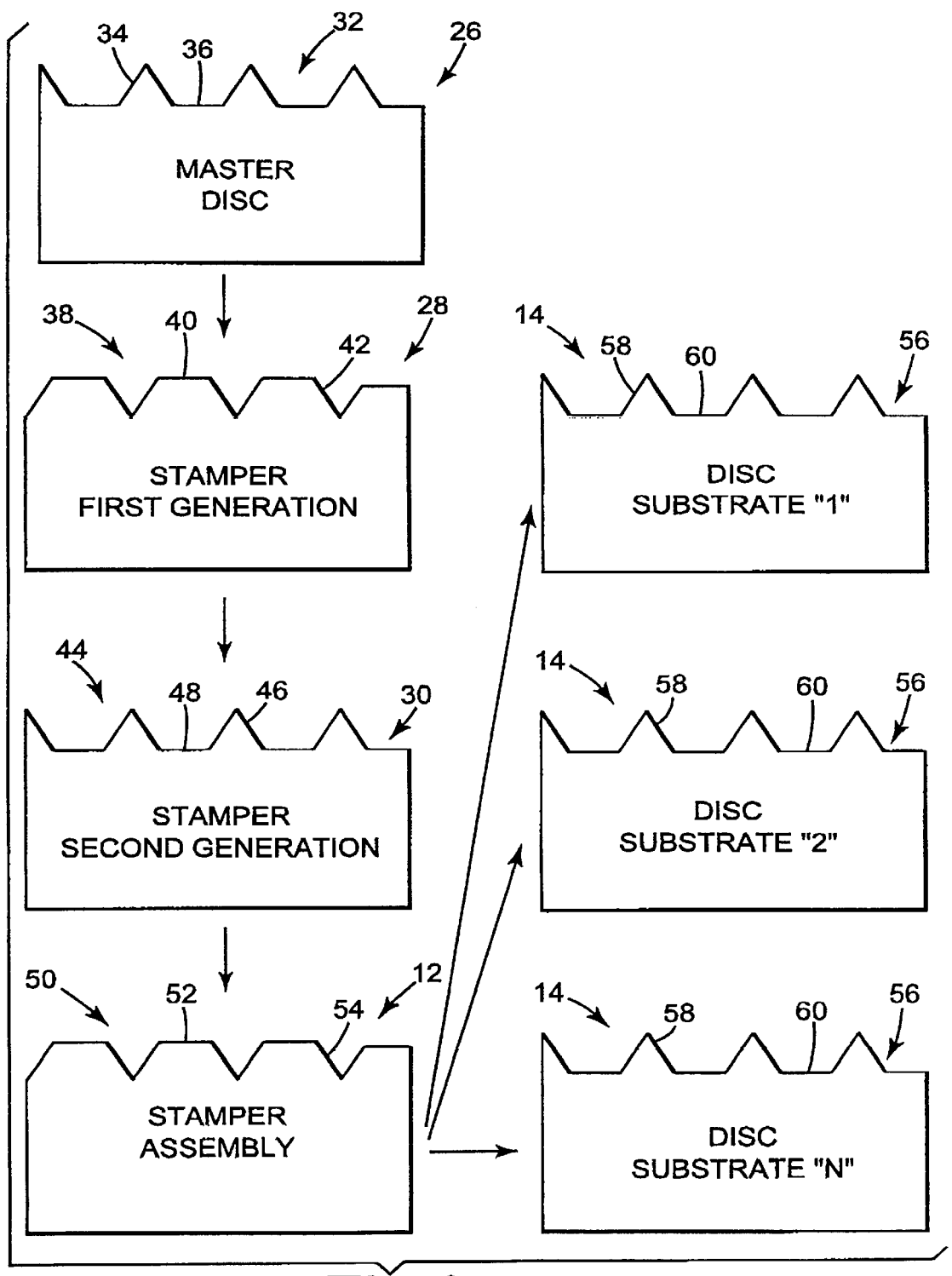
FIG. 2 is a diagram illustrating information surface relief patterns of a master disk, first and second generation stampers, stamper assembly and replica optical data storage disks based upon the process shown in FIG. 1.
Figure 7:
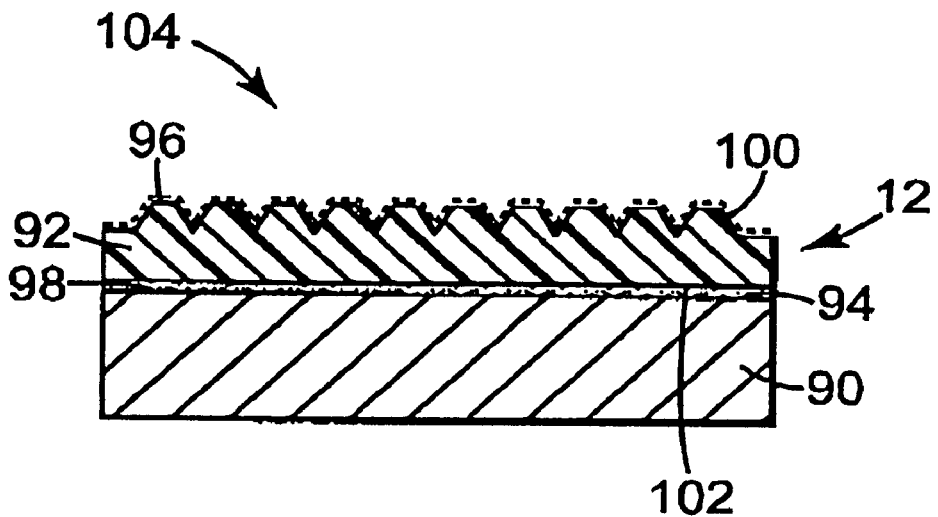
FIG. 7 is a cross sectional view of the stamper assembly in accordance with the present invention.
Figure 8:
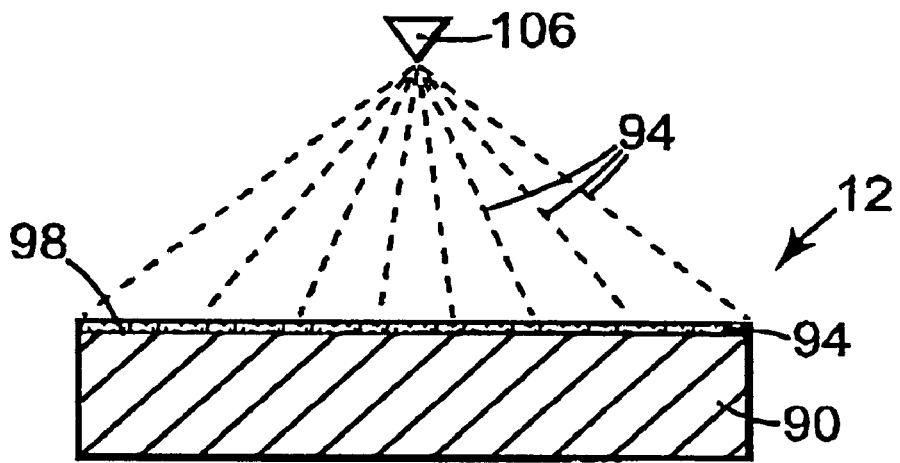
FIG. 8 is a cross sectional view illustrating a securing medium being applied to a mirror block element for making the stamper assembly of FIG. 7.

A process 10 (i.e., method) of manufacturing a stamper assembly and a stamper assembly 12 for forming replica optical data storage disks 14 in accordance with the present invention is illustrated generally in FIGS. 1, 2 and 7. As seen best in FIG. 1, the process 10 begins with providing a recorded master disk, indicated at 16. The recorded master disk includes an information layer having data which is encoded thereon/therein (i.e., a surface relief pattern in the form of grooves, pits or lands) using laser writing (i.e., recording) techniques. A first generation stamper is made from the recorded master disk using an electroforming (i.e., electroplating) process, indicated at 18. The electroforming process may be destructive to the recorded master disk. In one preferred embodiment, a portion of the recorded master disk, which defines the information layer, is transferred to and becomes part of the first generation stamper. A second generation stamper is made from the first generation stamper using a photopolymerization process, indicated at 20. The photopolymerization process is non-destructive to the first generation stamper, and maintains the integrity of the information layer transferred from the first generation stamper to the second generation stamper. As such, multiple second generation stampers may be formed using a single first generation stamper. These processes 18 and 20 for making the third generation stamper from the second generation stamper, and the second generation stamper from the recorded master disk are disclosed in U.S. patent application Ser. No. 09/055,641 entitled "Process For Making Multiple Data Storage Disk Stampers From One Master, filed on Apr. 6, 1998 which is assigned to the same assignee herein, and is incorporated herein in its entirety by reference thereto.

The stamper assembly 12 of the present invention is made from the second generation stamper using a photopolymerization process, indicated at 22 in accordance with the present invention. The photopolymerization process is non-destructive to the second generation stamper, and maintains the integrity of the information layer transferred from the second generation stamper to the stamper assembly 12. As such, multiple stamper assemblies 12 may be formed using a single second generation stamper. Lastly, multiple replica optical data storage disks 14 are made from the stamper assembly 12 using a molding process, indicated at 24.

In FIG. 2, the orientation of the information layers (i.e., surface relief patterns) of a recorded master disk 26, a first generation stamper 28, a second generation stamper 30, the stamper assembly 12, and multiple replica optical disks 14 (i.e. replica disk substrates 1, 2, . . . N) are illustrated. In particular, in one exemplary embodiment, the recorded master disk 26 includes a master information layer 32 having master lands 34 and master grooves 36. First generation stamper 28 includes first generation stamper information layer 38 having first generation stamper lands 40 and first generation stamper grooves 42. Second generation stamper 30 includes second generation stamper information layer 44 having second generation stamper lands 46 and second generation stamper grooves 48. The stamper assembly 12 includes stamper assembly information layer 50 having stamper assembly lands 52 and stamper assembly grooves 54. The replica optical disks 14 each include a substrate information layer 56 having substrate lands 58 and substrate grooves 60.

As can be seen in FIG. 2, the first generation stamper information layer 38 is the inverse of the master disk information layer 32. The second generation stamper information layer 44 is the inverse of the first generation stamper information layer 38, however, the orientation of the second generation information layer 44 corresponds to the orientation of the master information layer 32. The stamper assembly information layer 50 is the inverse of both the second generation stamper information layer 44 and the master information layer 32. Lastly, the substrate information layer 56 of each of the disks 14 is the inverse of the stamper assembly information layer 50, while the orientation of the substrate information layer 56 of each disk 14 (molded from the stamper assembly 12) corresponds to the orientation of the master disk information layer 32. It is recognized that the orientation of the master disk information layer 32 is dependent on the intended use of the desired replica optical disks 14. For example, for air incident applications, it may be desirable to mold a replica disk having flat lands, and for disks read through the substrate, it may be desirable to mold a replica disk having flat grooves.

Figure 3:
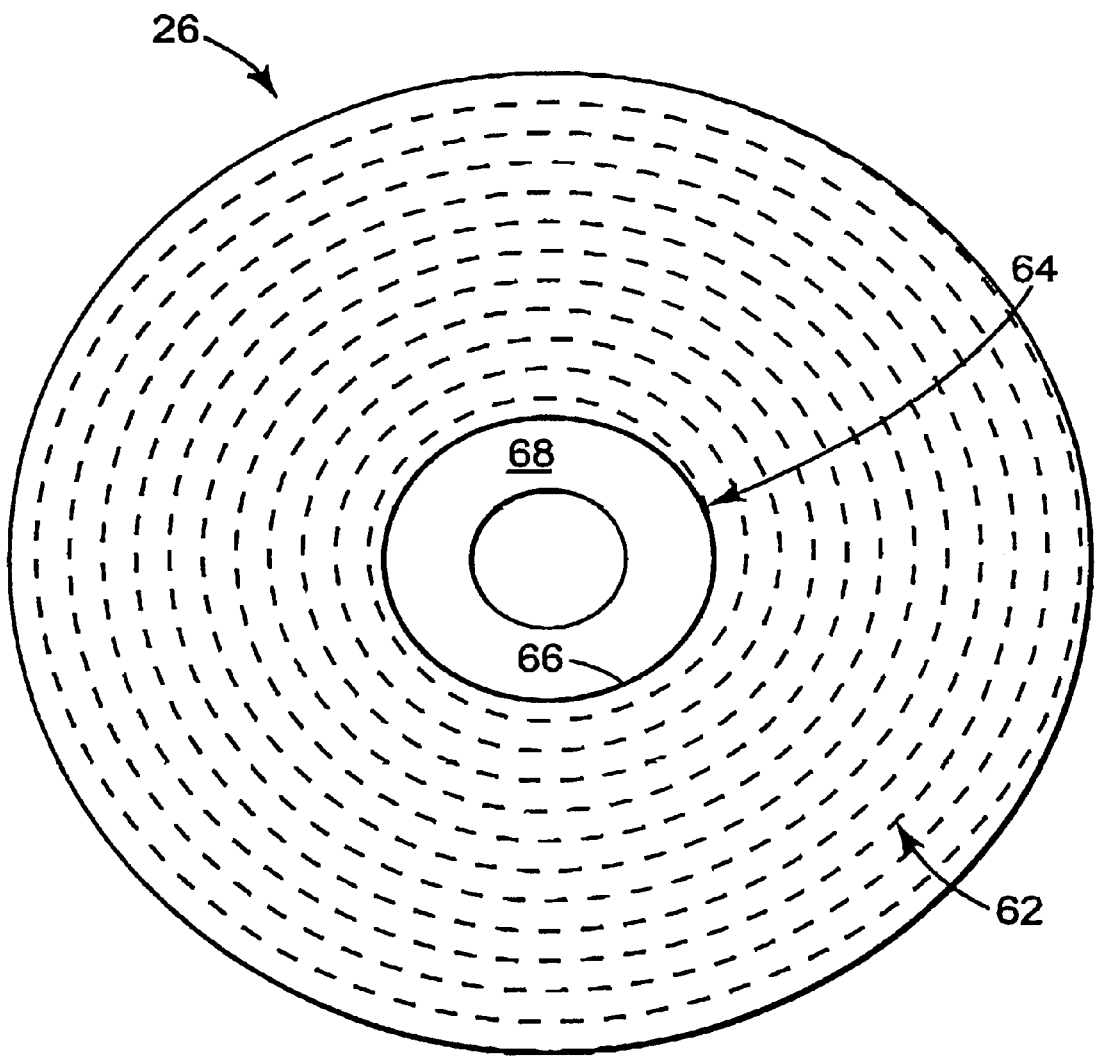
FIG. 3 is a plan view of one exemplary embodiment of a recorded master optical disk for use in the process for making the stamper assembly in accordance with the present invention.

In FIG. 3, one exemplary embodiment of a recorded master disk 26 is generally shown. The recorded master disk 26 can be similar to a recorded master disk used in disk molding replication processes for read only or writable optical disks, such as CD ROM, DVD, MO or phase change optical disks, as previously indicated herein. The recorded master disk 26 includes an information area 62 and a central portion 64 having an opening 66 therethrough. Optionally, a hub 68 can be located at the opening 66, or the recorded master disk 26 may not include an opening at all. Information area 62 includes data tracks (in the form of a series of grooves (or pits (e.g., in the header area) and lands) encoded therein. One preferred disk mastering process for making a recorded master disk 26 is disclosed in U.S. patent application Ser. No. 09/055,825 entitled "Reverse Optical Mastering", filed on Apr. 6, 1998 which is assigned to the same assignee herein, and is incorporated herein in its entirety by reference thereto. This disk mastering process includes exposing a layer of photoresist down to a disk substrate, resulting in the formation of flat, wide, relatively deep master disk grooves (and/or pits).

Figure 4:
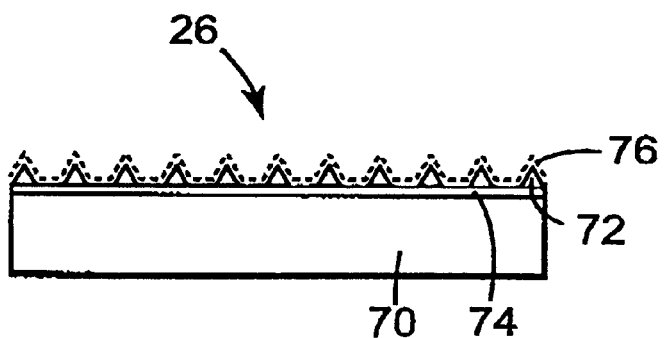
FIG. 4 is a partial cross sectional view of the recorded master optical disk shown in FIG. 3.

In FIG. 4, one exemplary embodiment of the recorded master disk 26 is shown. Recorded master disk 26 includes a support substrate 70 coupled to an information layer 72 by a bonding layer 74. The recorded master disk 26 may further include a reflective layer 76 positioned over the information layer 72. In one preferred embodiment, support substrate 70 is made of glass and is approximately 5 mm thick. The glass substrate 70 is polished smooth on one side with optical polish. The glass substrate 70 is then washed in a clean room to remove contaminants. A very thin bonding layer 74 (approximately 10 nanometers thick) of primer is then spin coated onto the glass support substrate 70. The information layer 72 may be formed by spin coating a layer of photoresist onto the bonding layer 74. The thickness of the information layer 72 (e.g., 50–200 nanometers) varies as desired according to the spin speed and the photoresist solution. Since spin coating is a solvent based process, the solvent can be driven out of the master disk 26 using a pre-bake process.

The master disk 26 is then placed on a laser beam recorder (i.e., laser beam exposure table), wherein the laser beam is turned on and the master disk 26 is spun at a desired speed to expose the information layer 72 (i.e., the photoresist) to the laser beam. The on and off shuttering of the laser beam is representative of the data to be encoded within the data tracks of information layer 72, or for the formation of grooves in the disk substrate. Next, the exposed master disk 26 undergoes a development process. In one preferred embodiment, sodium hydroxide and water are dispersed across the master disk 26 as it rotates. As the master disk 26 is spinning, the photoresist is etched away by the solution in the areas where the photoresist was exposed to the laser beam. The desired data pattern is now encoded on the master disk 26. To increase the durability of the recorded master disk 26 (after exposure of the disk 26 to the laser beam recorder and it's subsequent development), recorded master disk 26 is passed through a baking process. Prior to baking, the photoresist of the master disk 26 may be UV exposed. Baking the master disk 26 strengthens the cross-linking of the photoresist in the information layer 72, improving and increasing the bond strength of the photoresist to bonding layer 74. The desired temperature and bake time depends on the type of photoresist used in the process (e.g., baking the disk 26 at a temperature of 100° C. for 1 hour). It is recognized that over baking of the master disk 26 may tend to undesirably round the edges of the pits, or even worse, may eliminate them.

The process of baking the recorded master disk 26 may be modified to improve groove and pit geometries for a desired disk product. In one exemplary embodiment, for an air incident disk substrate, it is desirable to vary the intensity of the laser beam for a sufficient exposure time such that a master groove or pit (i.e., an interrupted master groove) is defined by the photoresist being etched away down to the bonding layer 74, resulting in high definition pits. Although the mastering process described herein utilizes a positive photoresist process, it is also recognized that a negative photoresist process may be used, as known by those skilled in the art. Lastly, the recorded master disk 26 is coated with reflective layer 76. In one preferred embodiment, the information layer 72 of the recorded master disk 26 is coated with a relatively thin reflective layer (e.g., 30 nanometers) of a metal, preferably nickel. The relatively thin reflective layer 76 serves at least two purposes. It provides a high quality reflecting surface for optical inspection of the disk quality and defects, and it protects the relatively fragile information layer 72 of the recorded master disk 26.

Figure 5:
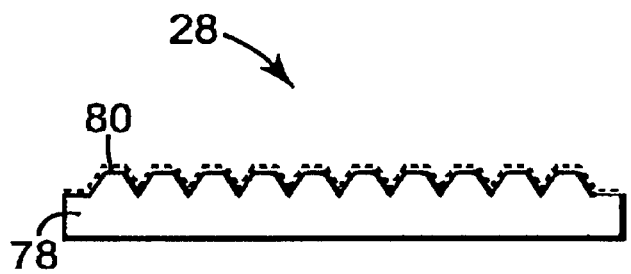
FIG. 5 is a partial cross sectional view of a first generation stamper for use in the process for making the stamper assembly in accordance with the present invention.

In FIG. 5, one exemplary embodiment of the first generation stamper 28 is shown. The first generation stamper 28 includes a structural layer 78 and a metal layer 80. The first generation stamper 28 is made from the recorded master disk 26 using the previously referenced electroforming process. In particular, the structural support layer 78 of nickel is built up to a desired, uniform thickness on the reflective layer 76 of the master disk 26. In one preferred embodiment, the nickel support layer 78 of the first generation stamper 28 has a thickness of approximately 300 microns. During the electroforming process, the reflective layer 76 of the master disk 26 becomes part of the nickel support layer 78 (i.e., reflective layer 76 becomes the metal layer 80) of the first generation stamper 28. After the electroforming process is complete, the first generation stamper 28 is removed from the master disk 26 and is cleaned. Since in the process of removing the first generation stamper 28 from the master disk 26, causes the reflective layer 76 to adhere to the support layer 78 to become the metal layer 80, this process is generally destructive to the master disk 26.

Figure 6:
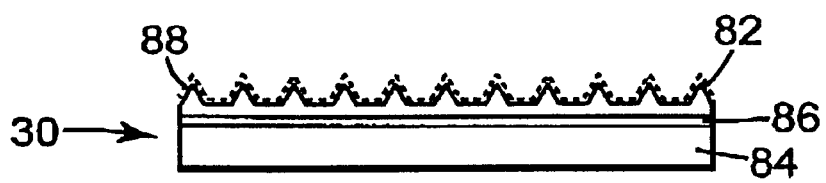
FIG. 6 is a partial cross sectional view of a second generation stamper for use in the process for making the stamper assembly in accordance with the present invention.

In FIG. 6, one exemplary embodiment of the second generation stamper 30 is illustrated. The second generation stamper 30 includes an information layer 82 bonded to a support substrate 84, which improves adhesion through the use of an adhesive primer 86. The information layer 82 covered by a metal layer 88 (i.e., a reflective layer). The second generation stamper 30 is made from the first generation stamper 28 using the previously referenced photopolymerization process. In particular, the information layer 82 is made of a photopolymer positioned between the support substrate 84 and the first generation stamper 28 using a known rolling bead replication process. One preferred rolling bead process for use in making a second generation stamper as described above is disclosed in U.S. Pat. No. 4,374,077 to Kerfeld issued on Feb. 15, 1983, entitled "Process for Making Information Carrying Disks", the entire disclosure of which is incorporated herein by reference thereto. In one preferred embodiment, the support substrate 84 is made of a transparent material, such as polymethylmethacrylate (PMMA). The adhesive primer 86 is spin coated onto the support substrate 84 to aid in bonding of the photopolymer information layer 82 to the support substrate 84. After completion of the rolling bead replication process, the photopolymer information layer 82 is cured using a known ultraviolet (UV) light process. In particular, UV light from the UV light source passes through the support substrate 84, curing the information layer 82 and bonding it to the support substrate 84.

After completion of the curing process, the first generation stamper 28 is removed (i.e., peeled away) from the second generation stamper 30. The second generation stamper 30 next goes through another UV exposure process to cure any remaining uncured perimeter photopolymer in information layer 82. The metal layer 88, of preferably nickel, is then sputtered onto the surface of the information layer 82. In one preferred embodiment, metal layer 88 is a nickel layer having a thickness of ten nanometers (it is recognized that other metals may be used, such as chromium). This photopolymerization process can be repeated hundreds of times creating many second generation stampers 30 from the first generation stamper 28 without destroying or deteriorating the quality of the first generation stamper 28. The preparation of the second generation stamper 30 is now complete and the second generation stamper 30 is ready for use in forming the stamper assembly 12.

FIG. 7 illustrates the stamper assembly 12, in accordance with the present invention, for forming optical data storage disks 14 in a disk molding process 24. The stamper assembly 12 includes a mirror block element 90, a stamper member 92, a securing medium 94 and a reflectance layer 96. The mirror block element 90 has a first major surface 98, while the stamper member has an upper, first major surface 100 and a lower, second major surface 102 opposite the first major surface 100. The first major surface 100 of the stamper member 92 of the stamper assembly 12 is adapted to contact a disk molding material for forming the optical data storage disks 14 in the disk molding process 24. In the preferred embodiment, the first major surface 100 of the stamper member 92 has a surface relief pattern 104 (i.e., information data layer) for forming a formatted pattern in the optical disks 14. Further, in the preferred embodiment, the mirror block element 90 is made of metal, such as stainless steel, the reflectance layer 96 is made of metal material, such as nickel, and the stamper member 92 is made of a photopolymer (i.e., a nonmetallic material), such as HDDA/HHA. HDDA/HHA is a (4x6x) polyethylenically unsaturated monomer—hexanediol diacrylate; hydantoin hexacrylate, and irgacure 651 (0.1x0.2) latent radical initiator—2,2-dimethoxy-2-phenylacetophenone more fully described in U.S. Pat. No. 4,296,158 to Lewis, entitled "Information Carrying Discs" issued Oct. 20, 1981, which is assigned to the same assignee herein, and is incorporated herein in its entirety by reference thereto.

Figure 9:
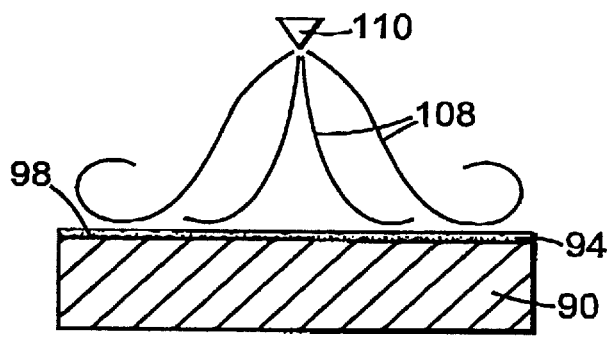
FIG. 9 is a cross sectional view similar to FIG. 8 showing an oxidation process used in the process for making the stamper assembly in accordance with the present invention.

The stamper assembly 12 is made from the second generation stamper 30 by the photopolymerization process 22 in accordance with the present invention and illustrated in FIGS. 8–12. As seen best in FIG. 8, the process 22 begins with the mirror block element 90. Since the first major surface 98 of the mirror block element 90 is a polished surface, it is necessary to form a textured layer of material on substantially the entire first major surface 98. This textured layer (i.e., adhesive primer) constitutes the securing medium 94 and improves the adhesive bonding of the photopolymer based stamper member 92 with the mirror block element 90 by increasing the bonding surface area of the first major surface 98. The textured layer securing medium 94 is a metal, such as aluminum, which is sputtered onto substantially the entire first major surface 98 of the mirror block element 90 via a sputtering mechanism 106. As seen in FIG. 9, with the completion of the sputtering process, the aluminum layer is subjected to steam 108, via a steam mechanism 110, which oxidizes the sputtered aluminum layer to complete the formation of the textured layer which constitutes the securing medium 94. In one preferred embodiment, the sputtered textured layer securing medium 94 has a thickness of fifty nanometers.

Figure 10:
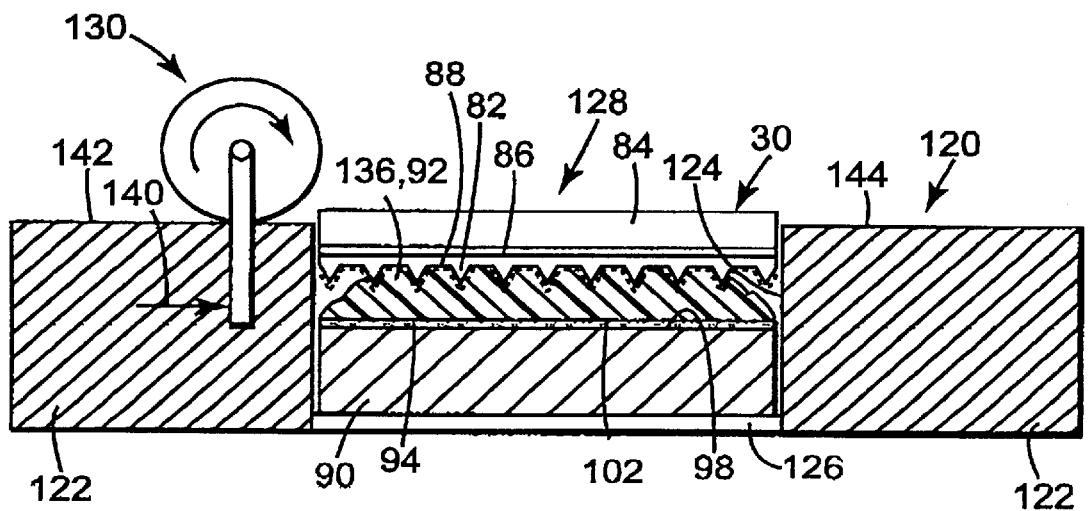
FIG. 10 is a cross sectional view of a bead rolling process used in the process for making the stamper assembly of FIG. 7.

As seen in FIG. 10, with the textured layer securing medium 94 formed thereon, the mirror block element 90 is placed in a rolling bead process mechanism 120. Rolling bead process mechanism 120 includes side wall 122 having a hole or opening 124 passing therethrough. Base 126 is positioned within opening 124. In one preferred embodiment, base 126 is made of a polymeric material (e.g., polycarbonate) or glass. Side wall 122, opening 124, and base 126 define a recess 128, which is slightly larger in diameter than the mirror block element 90. As such, recess 128 is capable of receipt of the mirror block element 90, such that mirror block element 90 is supported on base 126. Rolling bead processing mechanism 120 further includes roller mechanism 130 which is moveable relative to side wall 122 and base 126, and which moves across recess 128.

In operation, mirror block element 90 is positioned within recess 128. A quantity of UV curable photopolymer 136 (which forms the stamper member 92) is dispensed (in liquid form) onto substantially the entire first major surface 98 of the mirror block element 90 over the securing medium 94. The second generation stamper 30 is positioned over photopolymer layer 136 such that substantially the entire metal reflective layer 88 of the information layer 82 of the second generation stamper 30 contacts the photopolymer layer 136. Roller mechanism 130 is operated in a first direction, indicated by directional arrow 140, and rolled over second generation stamper 30 contacting the support substrate 84. As roller mechanism 130 passes between first side 142 and second side 144, the stamper member photopolymer 136 is distributed in uniform thickness across substantially the entire first major surface 98 of the mirror block element 90 over the securing medium 94. The liquid photopolymer 136 is "sandwiched" between the metal reflective layer 88 of the information layer 82 of the second generation stamper 30 and the mirror block element 90, to form the information layer 104 (i.e., surface relief pattern) of the first major surface 100 of the stamper member 92, information layer 112.

Figure 11:
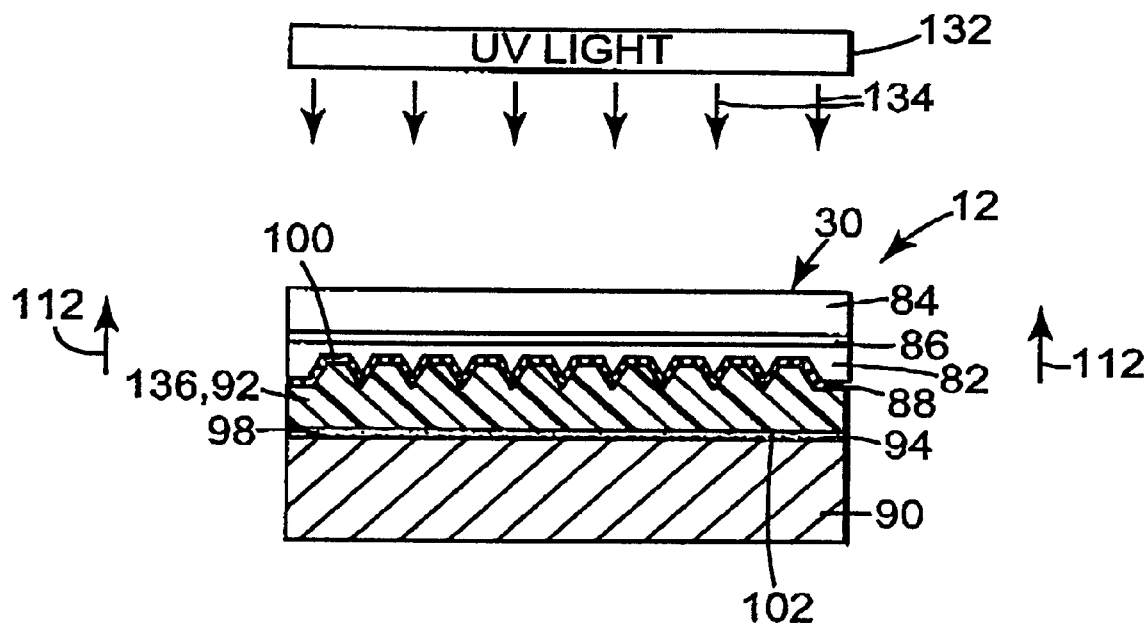
FIG. 11 is a cross sectional view of a ultraviolet light curing process used in the process for making the stamper assembly in accordance with the present invention.

As seen in FIG. 11, after completion of operation of the roller mechanism 130 and positioning of the second generation stamper 30 over the photopolymer layer 136, a UV light source 132 is operated to produce UV light 134 to cure the photopolymer layer 136 constituting the stamper member 92. In particular, since the support substrate 84, adhesive primer 86, photopolymer information layer 82 and reflective layer 88 are semi-transparent, UV light 134 passes through the support substrate 84, adhesive primer 86, information layer 82, and reflective layer 88 to cure the photopolymer layer 136. Once cured, the photopolymer layer 136 (i.e., stamper member 92) is securely bonded to mirror block element 90, through the securing medium 94, such that substantially the entire second major surface 102 of the stamper member 92 is affixed to the first major surface 98 of the mirror block element 90, so as to prevent relative movement between the stamper member 92 and mirror block element 90.

Figure 12:
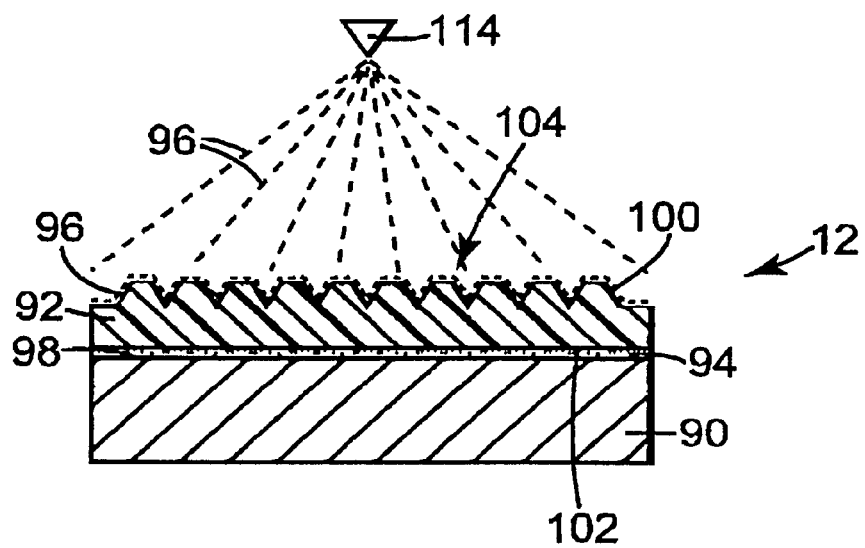
FIG. 12 is a cross sectional view of a sputtering process used in the process for making the stamper assembly of FIG. 7.

Once the photopolymer layer 136 constituting the stamper member 92 is cured, the second generation stamper 30 is stripped back or removed from the stamper member 92 of the stamper assembly 12, as represented by directional arrows 112 (FIG. 11). As the second generation stamper 30 is pulled, the reflective metal layer 88 releases from the photopolymer layer 136. The information layer 104 of the stamper member 92 is an information layer having data tracks encoded therein having an orientation which is the inverse of information layer 82 of the second generation stamper 30. The removal of the second generation stamper 30 from the stamper member 92 of the stamper assembly 12 is a nondestructive process to the second generation stamper 30 and the stamper assembly 12. The reflective layer 88 remains on the information layer 82 of the second generation stamper 30. The second generation stamper 30 is now reusable for making many stamper assemblies using the same process discussed above. As seen in FIG. 12, the information layer of the first major surface 100 of the stamper member 92 is coated using a sputtering mechanism 114 with the nickel metal layer 96 to complete the process 22 for manufacturing a stamper assembly 12 in accordance with the present invention. In one preferred embodiment, the metal layer 96 has a thickness of thirty nanometers.

Figure 13:
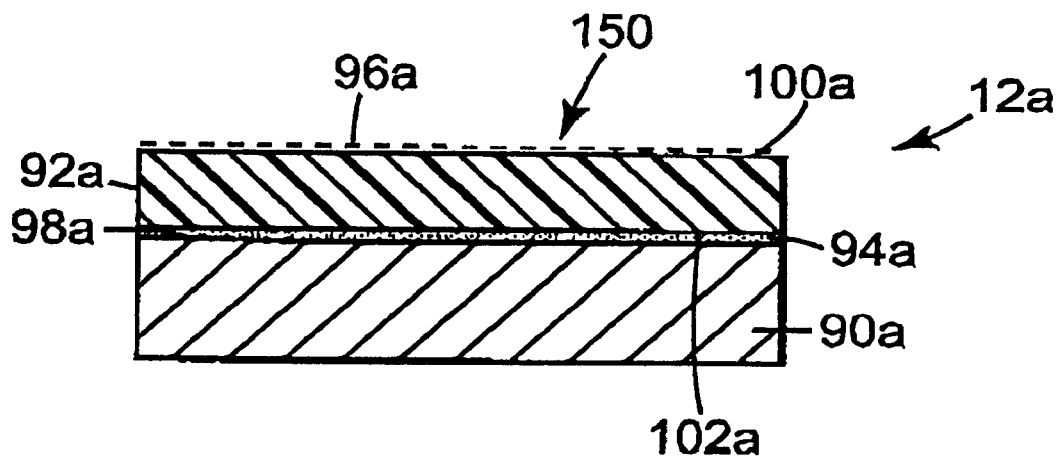
FIG. 13 is a cross sectional view illustrating an alternative embodiment of the stamper assembly in accordance with the present invention.

FIG. 13 illustrates an alternative stamper assembly embodiment 12a. Like parts are labeled with like numerals except for the addition of the subscript "a". In the alternative stamper assembly 12a, the first major surface 100a does not constitute an information layer 104 like the preferred embodiment of the stamper assembly 12. The first major surface 100a constitutes a smooth non-information surface layer 150 for forming an unrelieved surface in the optical data storage disks 14. This is useful for forming the non-information containing sides of single-sided optical disks 14. The alternative stamper assembly 12a is manufactured using the same process 22 as is used to manufacture the stamper assembly 12. The one major difference is that the information layer 82 of the second generation stamper 30 is a smooth unrelieved non-information surface layer, so as to form a like smooth surface 150 on the stamper member 92a of the alternative stamper assembly 12a.

Figure 14:
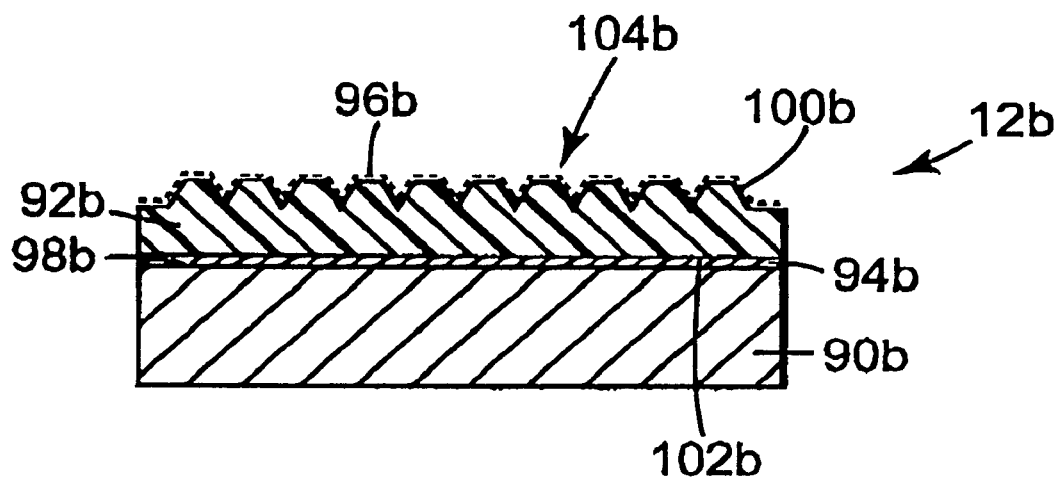
FIG. 14 is a cross sectional view illustrating a another alternative embodiment of the stamper assembly in accordance with the present invention.

FIG. 14 illustrates another alternative stamper assembly embodiment 12b. Like parts are labeled with like numerals except for the addition of the subscript "b". In the alternative stamper assembly 12b, the stamper member 92b is premanufactured of metal, such as nickel, and the securing medium 94b is an epoxy based adhesive that covers substantially the entire first major surface 98b of the mirror block element 90b to secure the stamper member 92b against movement to the mirror block 90b. The alternative stamper assembly 12b is manufactured using a process different from the process 22 for manufacturing the stamper assembly 12. In the alternative stamper assembly 12b the epoxy based adhesive securing medium 94b is preferably first applied to the first major surface 98b of the mirror block element 90b. Alternatively, the adhesive securing medium 94b could be applied directly to the second major surface 102b of the stamper member 92b. Next, the stamper member 92b is positioned on the mirror block element 90b, such the adhesive securing medium 94b contacts substantially the entire first and second major surfaces 98b and 102b of the mirror block element 90b and the stamper member 92b, respectively. The adhesive securing medium 94b is then allowed to cure, so as to secure the stamper member 92b to the block element 90b such that substantially the entire second major surface 102b of the stamper member 92b is affixed to the first major surface 98b of the block element 90b, so as to prevent relative movement between the stamper member 92b and the block element 90b.

Figure 15:
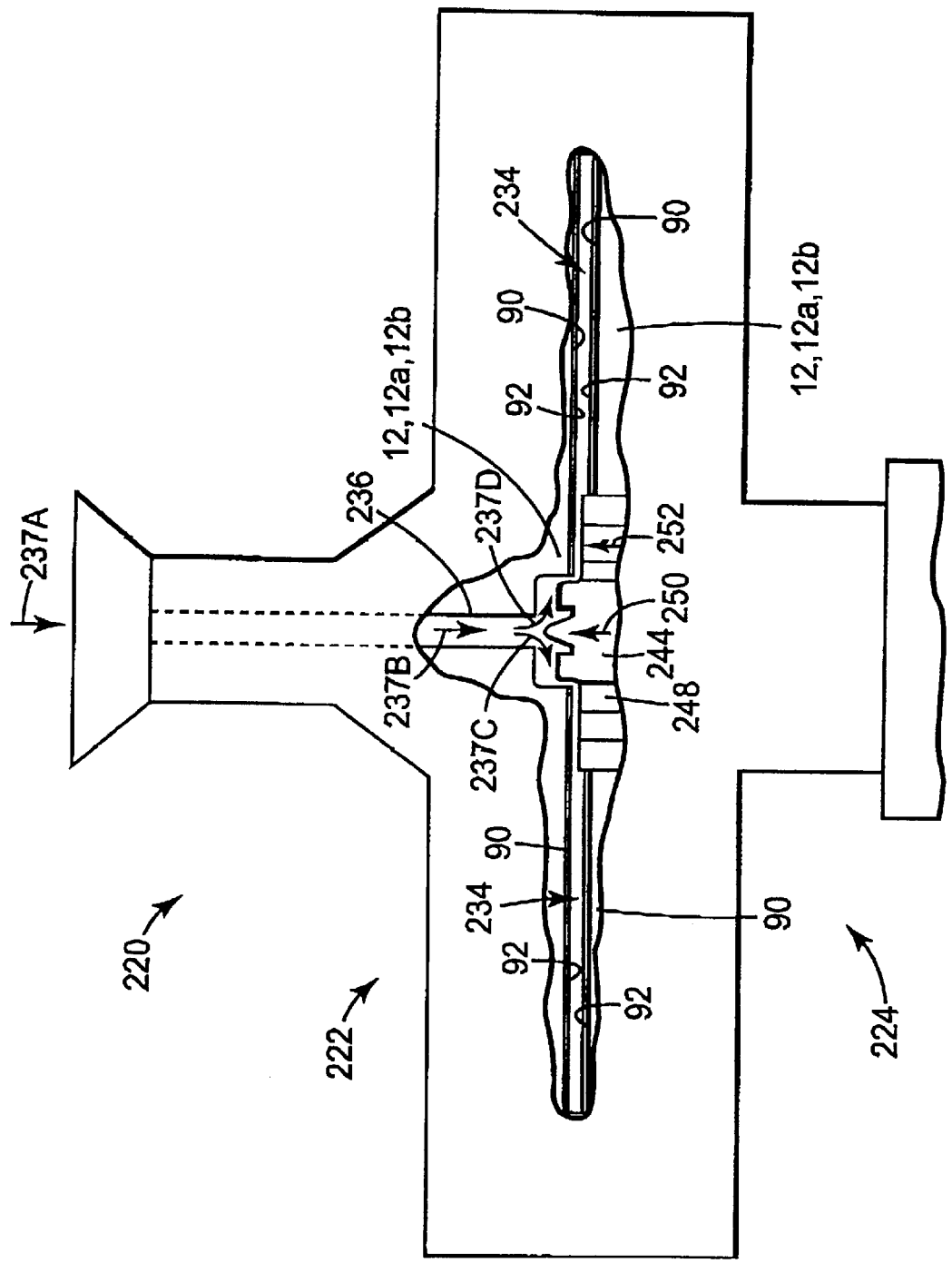
FIG. 15 is a partial cross sectional view of a mold assembly that uses the stamper assemblies of FIGS. 7, 13 and 14.

FIG. 15 illustrates a mold assembly 220 for using the stamper assembly 12, 12a, 12b for forming optical data storage disks 14 in a disk molding process. Mold assembly 220 includes a fixed side 222 and a moving side 224. During operation of the mold assembly 220, moving side 224 moves relative to fixed side 222 as the mold assembly 220 is moved between a mold open and a mold closed position. In particular, the mold assembly 220 includes a first stamper assembly 12 and an opposing identical second stamper assembly 12. In the exemplary embodiment shown, the first stamper assembly 12 is located on fixed side 222, and the second stamper assembly 12 is located on moving side 224. Each of the first and second stamper assemblies 12 includes a mirror block element 90 and a stamper member 92. When the mold assembly 220 is in the mold closed position, the stamper members 92 of the stamper assemblies 12 are spaced apart to define a disk substrate cavity 234, wherein the disk substrate cavity is approximately the size of a replica disk 14. A sprue channel 236 extends longitudinally into the mold assembly 22, in fluid communication with disk substrate cavity 234. As such, disk substrate molding material (e.g., a polycarbonate resin) may be injected under pressure through sprue channel 236 and into disk substrate cavity 234, indicated by arrows 237A, 237B, 237C and 237D.

The disk mold assembly 20 shown in FIG. 15 is set up for the molding of double-sided data storage disk 14 (i.e., a disk formatted on both sides), since both the fixed and moving sides 222 and 224 incorporate stamper assemblies 12 have stamper members 92 having formatted information layer 104 (i.e., surface relief pattern. Alternatively, any one or both of the stamper assemblies 12 could be replaced by stamper assemblies 12b to also produce double-sided data storage disks 14. As a further alternative, a stamper assembly 12a having a smooth non-information surface layer 150, could be positioned on either the fixed or moving sides 222 and 224 of the mold assembly 220, to be used with either one of the formatted stamper assemblies 12 and 12b to produce single-sided data storage disks 14.

Additional tooling parts may be located at the center region of mold assembly 220, such as a gate cut 244 and a product eject 248. Gate cut 244 and product eject 248 are moveable relative to the first and second stamper assemblies 12. After filling the disk substrate cavity 234 with resin to form a replica disk substrate, gate cut 244 may be brought forward, indicated by arrow 250, to cut a center hole in the replica disk substrate. After the replica disk 14 has sufficiently cooled, the mold assembly 220 is opened and the gate cut 244 and product eject 248 may be brought forward, indicated by arrow 252 for ejecting the formatted replica disk substrate 14 off of the mold assembly 220, and in particular, second stamper assembly 12.

The stamper assembly 12, 12a, 12b prevents relative movement between the stamper member 92, 92a, 92b and the block element 90, 90a, 90b, since substantially the entire second major surface 102, 102a, 102b of the stamper member 92, 92a, 92b is affixed to the first major surface 98, 98a, 98b of the block element 90, 90a, 90b. Because the stamper member 92, 92a, 92b is totally secured to the block element 90, 90a, 90b, movement of the stamper member 92, 92a, 92b relative to the block element 90, 90a, 90b due to pressure and temperature cycling (i.e., expansion and contraction) during the molding process is virtually eliminated. In addition, stamper member 92, 92a, 92b flexing during opening of the mold assembly 220 and the subsequent ejection of the formatted replica disk substrate 14 off of the stamper member 92, 92a, 92b is essentially nonexistent. Since the stamper member 92, 92a, 92b no longer loses contact with the block element 90, 90a, 90b, the block element 90, 90a, 90b uniformly draws heat from the stamper member 92, 92a, 92b to provide even cooling of the replica disk substrates 14. Even cooling of the disk substrates 14 improves the formation of the surface relief patterns and ultimately the playability of the manufactured replica optical disks 14. Moreover, the medium 94, 94a, 94b for securing the stamper member 92, 92a, 92b to the block element 90, 90a, 90b provides insulating properties that slow the transfer of heat from the stamper member 92, 92a, 92b to the block element 90, 90a, 90b. This slowing of heat transfer allows the replica disk substrates 14 to remain hotter slightly longer during the molding process, which makes the surface relief pattern easier to form.

With virtually no relative movement between the stamper member 92, 92a, 92b and the block element 90, 90a, 90b, excessive wear on the second major surface 102, 102a, 102b (i.e., backside) of the stamper member 92, 92a, 92b and excessive wear to the block element 90, 90a, 90b is substantially eliminated. Hence, the noise floor increase and the playability issues, due to roughness in the molded replica optical disks 14 because of excessive wear to either of these components, is no longer a principal concern. Moreover, because stamper member 92, 92a, 92b wear has been substantially curtailed, the stamper assembly 12, 12a, 12b of the present invention has an increased average, useful production lifetime. In addition, since the stamper member 92, 92a, 92b is directly affixed to the first major surface 98, 98a, 98b of the block element 90, 90a, 90b, the stamper assembly 12, 12a, 12b of the present invention is useable either by itself or with another like stamper assembly 12, 12a, 12b on either one or both of the fixed and moving sides 222 and 224 of the mold assembly 220 to form either single-sided or double-sided optical data storage disks 14. Lastly, the stamper assembly 12, 12a, 12b of the present invention provides all these features while being relatively easy and inexpensive to manufacture.

Although the present invention has been described with reference to preferred embodiments, workers skilled in the art will recognize that changes may be made in form and detail without departing from the spirit and scope of the invention.

What is claimed is:

1. A stamper assembly for forming an optical data storage disk in a disk molding process, the stamper assembly comprising:

a block element having a first major surface;

a stamper member having a first major surface and a second major surface opposite the first major surface, wherein the first major surface of the stamper member is engageable with a disk molding material for forming an optical data storage disk in a disk molding process; and means for securing the stamper member to the block element, the securing means securely bonding the member to the block element, and covering substantially all of the first major surface of the block element such that substantially the entire second major surface of the stamper member is bonded to the first major surface of the block element so as to prevent relative movement between the stamper member and the block element, wherein the securing means includes:
a textured layer of material that covers substantially the entire first major surface of the block element; and
a photopolymer material from which the stamper member is made which bonds to the textured layer of material to secure the stamper member to the block element.

2. The stamper assembly of claim 1 wherein the photopolymer is HDDA/HHA (4×6×) polyethylenically unsaturated monomer—hexanediol diacrylate; hydantoin hexacrylate, and irgacure 651 (0.1×0.2) latent radical initiator—2,2-dimethoxy-2-phenylacetophenone.

3. The stamper assembly of claim 1 wherein the textured layer of material is aluminum.

4. The stamper assembly of claim 3 wherein the block element is a mirror block made of stainless steel.

5. The stamper assembly of claim 1 wherein the first major surface of the stamper member has a surface relief pattern for forming a formatted pattern in the optical data storage disk.

6. The stamper assembly of claim 1 wherein the first major surface of the stamper member is unrelieved for forming an unrelieved surface in the optical data storage disk.

7. The stamper assembly of claim 1 wherein the first major surface of the stamper member is covered with a reflectance layer of metal material.

8. The stamper assembly of claim 7 wherein the metal material of the reflectance layer is nickel.

9. A mold assembly for forming an optical data storage disk in a disk molding process, the mold assembly being movable between a mold open position and a mold closed position, the mold assembly comprising:

a first mirror block having a first major surface;

a second mirror block having a first major surface, wherein when the mold assembly is in the mold closed position, the first major surfaces of the first and second mirror blocks form a disk substrate cavity;

a channel in fluid communication with the disk substrate cavity for allowing disk molding material to enter the disk molding cavity to form the optical data storage disk;

a first stamper member having a first major surface and a second major surface opposite the first major surface, wherein the first major surface of the first stamper member is engageable with the disk molding material for forming a formatted pattern on a first side of the optical data storage disk; and means for securing the first stamper member to the first mirror block, the securing means securely bonding the first stamper member to the first mirror block, and covering substantially all of the first major surface of the first mirror block such that substantially the entire second major surface of the first stamper member is bonded to the first major surface of the first mirror block so as to prevent relative movement between the first stamper member and the first mirror block, wherein the securing means includes:
a textured layer of material that covers substantially the entire first major surface of the first mirror block; and
a photopolymer material from which the first stamper member is made which bonds to the textured layer of material to secure the first stamper member to the first mirror block.

10. The mold assembly of claim 9, and further including:

a second stamper member having a first major surface and a second major surface opposite the first major surface, wherein the first major surface of the second stamper member is engageable with the disk molding material for forming a formatted pattern on a second side of the optical data storage disk; and means for securing the second stamper member to the second mirror block, the securing means securely bonding the second stamper member to the second mirror block, and covering substantially all of the first major surface of the second mirror block such that substantially the entire second major surface of the second stamper member is bonded to the first major surface of the second mirror block so as to prevent relative movement between the second stamper member and the second mirror block, wherein the securing means second stamper includes:
a second textured layer of material that covers substantially the entire first mayor surface of the second mirror block, and
a photopolymer material from which the second stamper member is made which bonds to the second textured layer of material to secure the second stamper member to the second mirror block.

* * * * *